United States Patent [19]

Coslett

[11] Patent Number: 5,067,541

[45] Date of Patent: Nov. 26, 1991

[54] COLLAPSIBLE SUN SHADE AND METHOD FOR SHIELDING THE SUN

[76] Inventor: Fred L. Coslett, 4227 Boca Pointe Dr., Sarasota, Fla. 34238

[21] Appl. No.: 519,960

[22] Filed: May 7, 1990

[51] Int. Cl.$^5$ .............................................. E06B 9/06
[52] U.S. Cl. ..................... 160/84.1; 160/32
[58] Field of Search ............ 160/84.1, 192, 194, 160/299, 305, 317, 315, 313, 32; 296/97.8, 97.7

[56] References Cited

U.S. PATENT DOCUMENTS

| | | | |
|---|---|---|---|
| 4,647,102 | 3/1987 | Ebrahimzadeh | 296/97.8 X |
| 4,707,018 | 11/1987 | Gavagan | 296/97.8 X |
| 4,727,919 | 3/1988 | Kraeutler | 160/84.1 |
| 4,758,042 | 7/1988 | Liu | 160/84.1 X |
| 4,775,180 | 10/1988 | Phillips | 160/84.1 |
| 4,932,711 | 6/1990 | Goebel | 160/84.1 X |

*Primary Examiner*—Blair M. Johnson
*Attorney, Agent, or Firm*—John Wade Carpenter

[57] ABSTRACT

A collapsible sun shade having plural pleated blades consecutively joined in series to form a serrated shape with an upper blade mounted within a hollow housing and a lower blade secured to a plate member. A coiled spring plate is resiliently wound around a spool member which is rotatably mounted within the hollow housing. One end of the coiled spring plate passes through each of the blades and connects to a plate member that is capable of being biasingly retained over the hollow housing by the coiled spring plate when the plurality of blades is folded into the hollow housing in an accordion-like fashion. A brake is mounted in the hollow housing for engaging the spool member and preventing the same from rotating. A method for shielding the sun which includes grasping the plate member, after the brake has been released from engagement with the spool member, and pulling the plate member away from the hollow housing until a desired length of plural blades has been presented for sun shielding purposes; and subsequently imposing the brake against the spool member to prevent the same from rotating and to maintain the extension of the desired length of plural blades away from the hollow housing.

11 Claims, 9 Drawing Sheets

COLLAPSIBLE SUN SHADE AND METHOD FOR SHIELDING THE SUN

BACKGROUND OF THE INVENTION

1. Field of the Invention

This invention relates to an anti-glare device for shielding the rays of light emanating from the sun. More particularly, the present invention provides a collapsible sun shade that can be adjustably and removably secured in proximity to a transparent panel, such as a windshield of a vehicle or a picture window in a house, for eliminating or modifying rays and light emanating from the sun and/or reflected from shiny ornamentations or accessories postured in proximity to the transparent panel.

2. Description of the Prior Art

A patentability investigation was conducted and the following U.S. patents were discovered: U.S. Pat. No. 3,003,812 to Haugland; U.S. Pat. No. 4,248,473 to Hildebrand; U.S. Pat. No. 4,647,102 to Ebrahimzadeh; U.S. Pat. No. 4,707,018 to Gavagan; U.S. Pat. No. 4,758,042 to Liu; and U.S. Pat. No. 4,775,180 to Phillips. All of these prior art U.S. patents are fully incorporated herein by reference thereto.

SUMMARY OF THE INVENTION

The present invention accomplishes its desired objects by broadly providing a collapsible sun shield comprising a generally hollow housing having a pair of sides, a closed back, and a front wherethrough a serrated shielding means for shielding the sun can be folded in an accordion-like fashion. At least one support member is contained in the hollow housing for rotatably supporting a spool or spindle member. The serrated shielding means for shielding the sun comprises a plurality of pleated blades consecutively adjoined together for forming a corrugated or serrated shape with a pair of extreme blades. One of the extreme blades defines a lower blade while the other extreme blade defines an upper blade. Each blade of the serrated shielding means has a structure defining an aperture. The upper blade of the serrated shielding means is contained in the hollow housing and is secured to or mounted to the inside of said hollow housing. The lower blade of the serrated shielding means is connected to a plate member which is capable of closing in the front of the hollow housing when the serrated shielding means is folded or collapsed thereinto. The collapsible sun shield also comprises at least one coiled spring plate having an upper end portion that is mounted to the spool or spindle member and a lower end portion that passes through each aperture of the plurality of blades and connects to the plate member. The remaining structure of the coiled spring plate helically surrounds the spool or spindle member such as to be normally resiliently wound thereon. A brake member is secured to the support member to provide a releasably engaging braking function on or against the rotatably mounted spool or spindle member. When the brake member is released from engagement with the spool or spindle member, the plate member can be grasped and lifted and/or pulled away from the hollow housing causing the folded serrated shielding means to unfold from within the hollow housing and extend biasingly the coiled spring plate whose lower end portion is connected to the plate member. The plate member is continually pulled or extended away from the hollow housing until a desired length of adjoined blades has been obtained from the hollow housing. Subsequently the brake member is caused to reengage the spool or spindle member to cause the same to become non-rotatable and to maintain the desired length of adjoined blades and prevent the coiled spring plate from retracting on the rotatable spool or spindle member. When the spool or spindle member becomes non-rotatable, the coiled spring plate can not retract to helically surround and wind around the spool or spindle member.

The present invention also accomplishes its desired objects by further broadly providing a method for shielding the sun comprising the steps of:

(a) providing a generally hollow housing having at least one support member contained therein and a spindle member rotatably mounted to the support member;

(b) providing a serrated shielding means for shielding the sun and having a plurality of pleated blades consecutively adjoined together to furnish a serrated shape with an upper extreme blade and a lower extreme blade and with each of said plural blades having a structure defining an aperture;

(c) mounting the upper extreme blade of the serrated shielding means in the generally hollow housing;

(d) connecting an upper end section of a coiled spring plate to the spindle member and winding the coiled spring plate around the spindle member such that the coiled spring plate is normally resiliently wound;

(e) extending a lower end section of the coiled spring plate from the spindle member and through each aperture of each blade;

(f) connecting the lower extreme blade of the serrated shielding means and the lower end section of the coiled spring plate to a plate member and folding the serrated shielding means into the generally hollow housing such that the coiled spring plate biasingly resiliently retains the serrated shielding means within the hollow housing;

(g) imposing a brake against the spindle member to prevent the spindle member from rotating and to assist the coiled spring plate in retaining the serrated shielding means within the hollow housing and to prevent the serrated shielding means from being released from within the hollow housing;

(h) releasing the brake from against the spindle member;

(i) grasping the plate member and pulling the same from the hollow housing until a desired length of serrated shielding means has been extended away from the hollow housing for sun shielding purposes; and (j) reimposing the brake against the spindle member in order to maintain the extension of the desired length of serrated shielding means from the hollow housing such that the desired length shields the sun.

It is therefore an object of the present invention to provide a collapsible sun shade.

It is another object of the present invention to provide a method for shielding the sun.

These, together with the various ancillary objects and features which will become apparent to those skilled in the art as the following description proceeds, are attained by this novel collapsible sun shade and method as shown with reference to the accompanying drawings by way of example only, wherein:

DETAILED DESCRIPTION OF THE INVENTION

Figure 8:
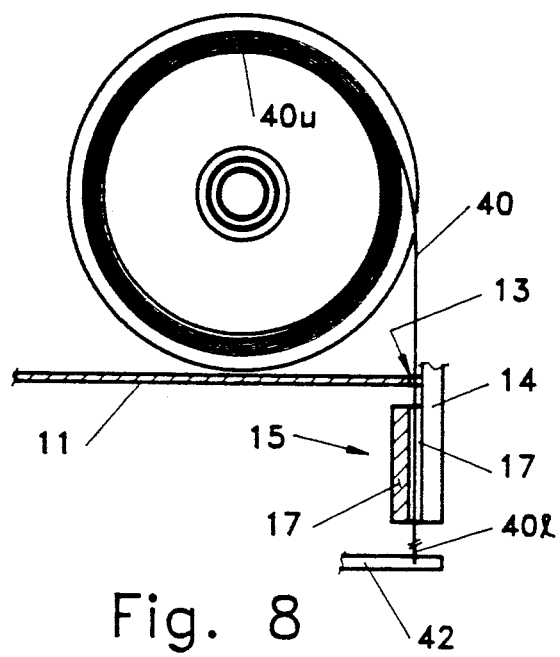
FIG. 8 is an enlarged vertical sectional view disclosing the coiled spring plate wound around the spool or spindle member with a free end of the coiled spring plate passing through a guide slot.

Referring in detail now to the drawings where similar parts of the invention are represented by like reference numerals, there is seen the collapsible sun shade, generally illustrated as 10. The collapsible sun shade 10 comprises a generally hollow housing, generally illustrated as 12, which has a pair of opposed sides 14—14 with lower edges 14e—14e, a back 16 bound to the opposed sides 14—14, and a front, generally illustrated as 18, which is generally open. A partition member 11 is connected to the opposed sides 14—14 and has a guide aperture 13 for guiding and receiving therethrough the structure of a coiled spring plate to be identified as 40 below. Connected to the ends of the sides 14—14 and the back 16 is a pair of ends 20—20 such that the hollow housing 12 essentially forms a rectangular box with the partition member 11 forming a floor or partition and the front 18 providing a longitudinal opening that is defined by the distance between the lower edges 14e—14e and the ends 20—20. Optionally, the hollow housing 12 may be formed with a guide chute 15 (see FIG. 8) which is defined by a U-shaped guide channel member 17 bound to a side 14. The function of the guide aperture 13 and the guide chute 15 is to guide the below identified coiled spring plate as it leaves the hollow housing 12.

Figure 9:
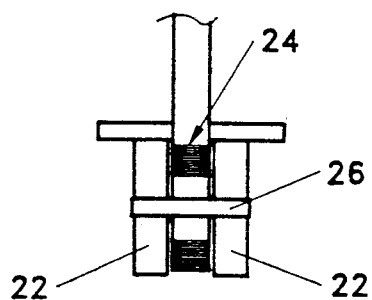
FIG. 9 is an end elevational view of one embodiment of the coiled spring plate wound around a spool or spindle member which is rotatably mounted to a pair of support posts or members.
Figure 16:
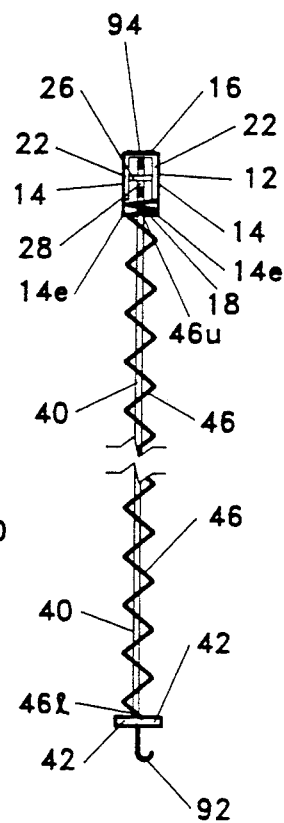
FIG. 16 is a segmented end elevational view of the collapsible sun shade of FIG. 15.
Figure 17:
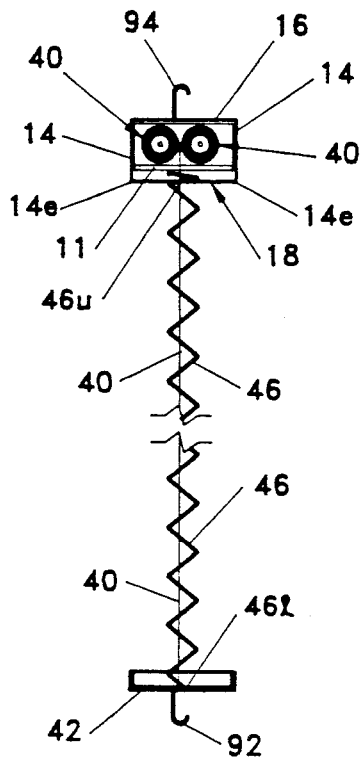
FIG. 17 is a segmented side elevational view of the coiled spring assembly illustrating a pair of coiled spring plates extended that the structures of the pair of coiled spring plates are in a contacting relationship and pass through apertures in each of the blades and connect to the plate member or cover plate.
Figure 21:
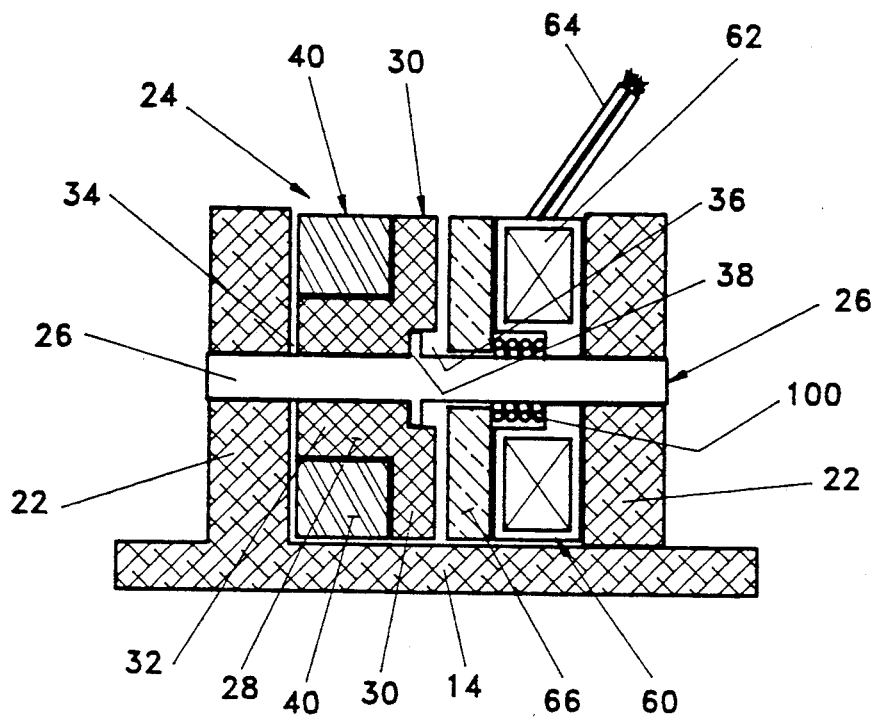
FIG. 21 is a vertical sectional view of an electromechanical brake member disposed on a support member such as to be in a position to releasably engage a spool or spindle member to prevent same from rotating and assisting in the releasing of a coiled spring plate wound thereto.
Figure 22:
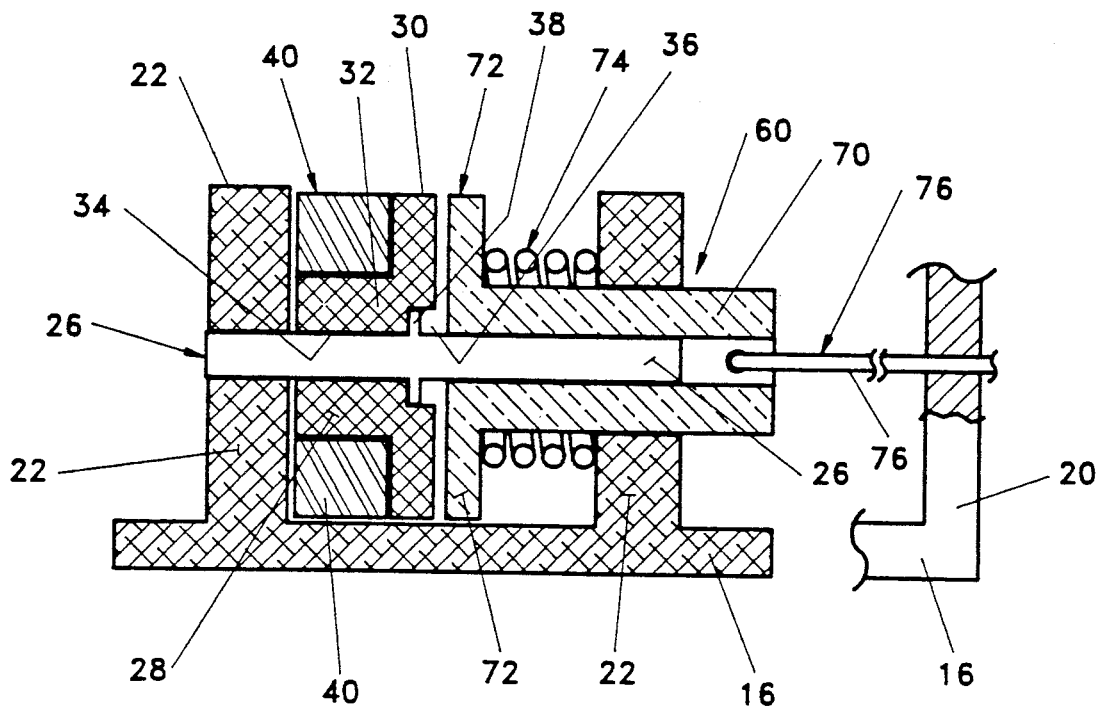
FIG. 22 is a vertical sectional view of a mechanical brake member disposed on a support member such as to be in a position to releasably engage a spool or spindle member to prevent same from rotating and assisting in the release of a coiled spring plate wound thereto.

Mounted to the inside of the hollow housing 12, more particularly to the back 16 of the housing 12, is at least one pair of support members 22—22, preferably two pairs of support members 22—22 and 22—22 as best shown in FIG. 9 or 16. Each pair of support members 22—22 has the respective support members 22 opposed to each other at a predetermined, desired distance such that each pair of support members 22—22 is separated by an opening or space, generally illustrated as 24. Rotatably secured to each pair of support members 22—22 and bridging the space 24 is a shaft 26. Rotatably mounted on the shaft 26 is a spool or spindle member 28. As best illustrated in FIGS. 21 and 22, the spindle member 28 comprises a flanged face 30 integrally formed with a body 32 and a longitudinal bore 34 extending through the body 32 and the flanged face 30. The shaft 26 rotatably passes through the bore 34. Preferably, the flanged face 30 has a recess 36 and the shaft 26 has a bearing plate 38 integrally formed therewith for seating in the recess 36. As best illustrated in FIGS. 21 and 22, the bearing plate 38 functions to maintain the spindle member 28 in close proximity to one of the support members 22; thus, the spindle member 28 is rotatably sandwiched between one of the support members 22 and the bearing plate 38 while being rotatably mounted on the shaft 26.

The collapsible sun shade 10 also comprises a coiled spring plate, generally illustrated as 40, which is normally resiliently wound on the body 32 of the spindle member 28. More specifically, the coiled spring plate 40 has an upper end portion 40U affixed to the body 32 and a lower end portion 40L which passes through the guide aperture 13 and/or the guide chute 15 which, as previously indicated, is defined by the U-shaped guide channel member 17 mounted to a side 14 of the hollow housing 12. The lower end portion 40L of the coiled spring plate 40 connects to a plate or cover member 42. The coiled spring plate 40 may be of any structure possessing a constant force such that there is a bias or tendency to recoil without the use of any outside force, such as a restoring spring (not shown) in the spool or spindle 28 to help restore the spring plate 40 around the body 32 of the spindle 28. The constant force coiled spring plate 40 provides a complete shade support and retraction power. No other devices are required for these functions, the coiled spring plate 40 provides the smallest and least complicated method for supporting and retracting the shade material, identified as 44 below. A suitable constant force spring plate 40 is that sold under the trademark CONFORCE ® owned by the Vulcan Spring and Manufacturing Company.

Figures 1, 2:
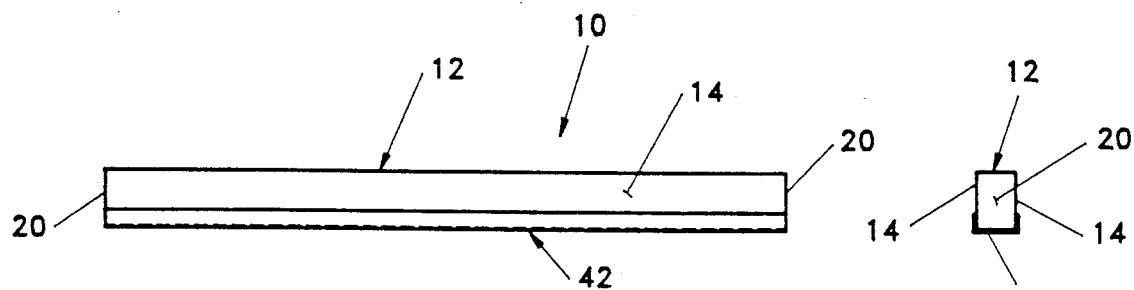
FIG. 1 is a side elevational view of the collapsible sun shade assembly totally contained in a housing.
FIG. 2 is an end elevational view of the collapsible sun shade assembly of FIG. 1.
Figure 3:
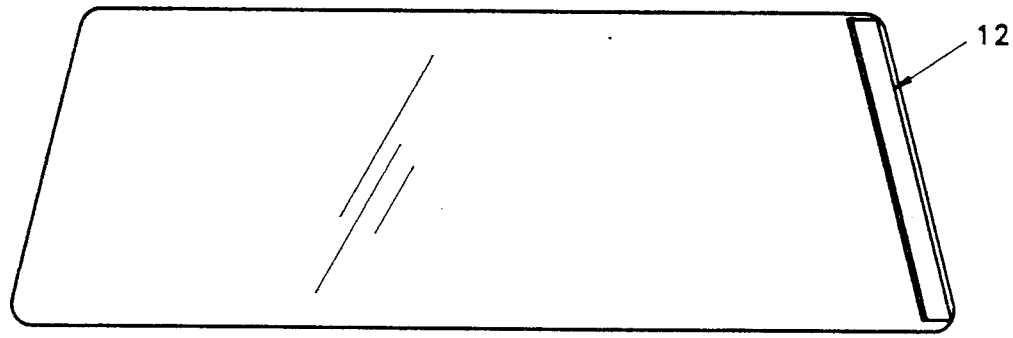
FIG. 3 is a front elevational view of the housing containing a retracted shade assembly and mounted to a support post of a windshield of a vehicle or directly to the windshield of the vehicle.
Figure 4:
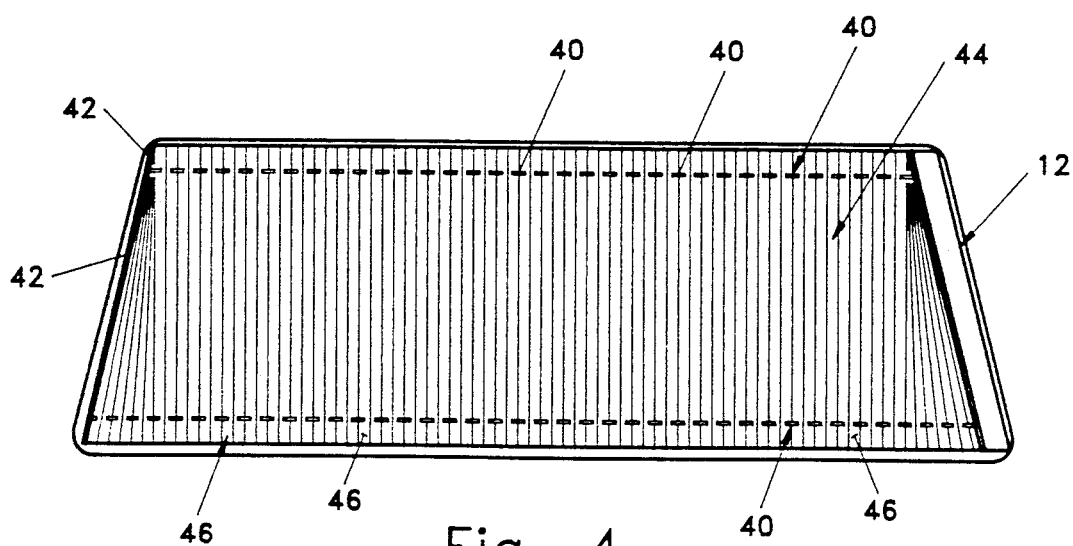
FIG. 4 is a front elevational view of the collapsible sun shade wherein the shade assembly is extended out of the housing and across the windshield and the plate member or cover plate is connected to the windshield or to a support post opposed to the support post supporting the housing of the collapsible sun shade.
Figure 5:
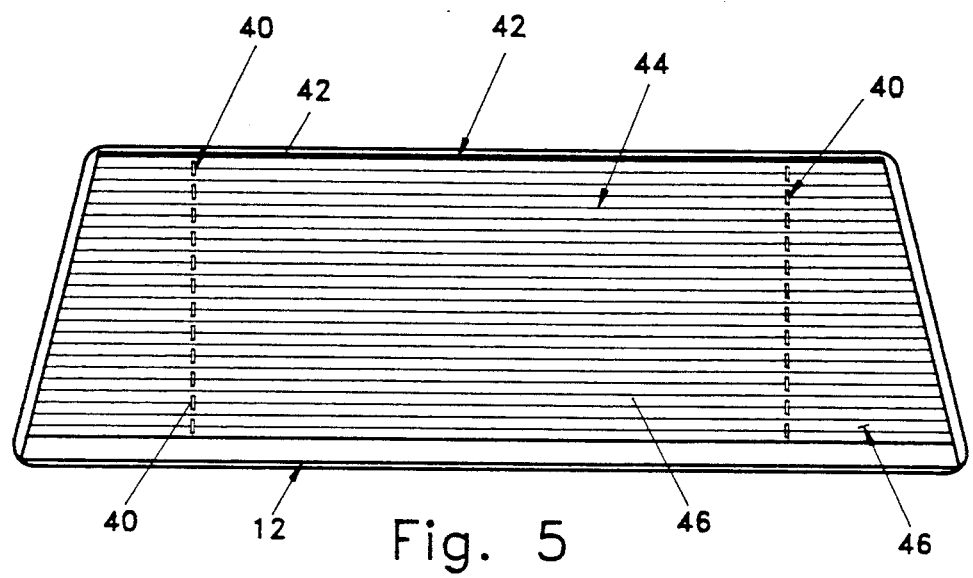
FIG. 5 is a front elevational view of the collapsible sun shade wherein the housing is mounted at the lower part or edge of a rear window of a vehicle and the shade assembly is extended out of the housing to cover the rear window and the plate member or cover plate is connected to a top part or edge of the rear window.
Figure 6:
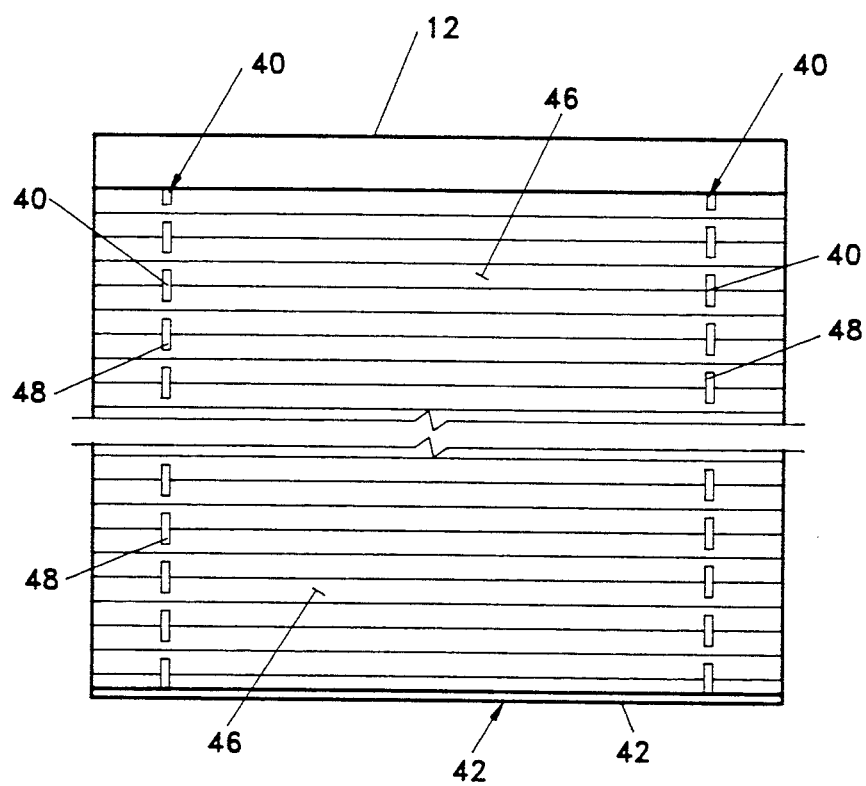
FIG. 6 is a segmented front elevational view of the shade assembly extended out of the housing with the coiled spring plate passing through slots or apertures in each of the panels or blades of the shade assembly.
Figure 7:
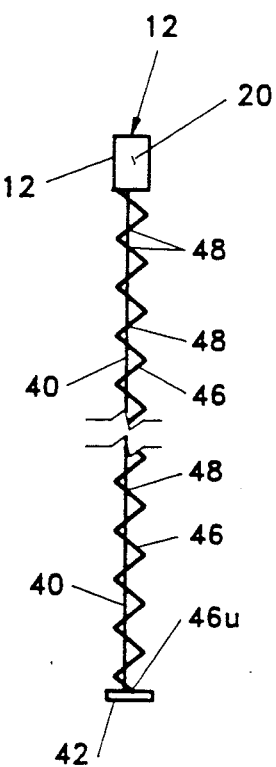
FIG. 7 is a segmented side elevational view of the shade assembly of FIG. 6.

A serrated shielding means, generally illustrated as 44, is provided for shielding the sun, and includes plural pleated blades 46 (or panel members) consecutively adjoined together to form a serrated (or corrugated) shape as viewed from its longitudinal section. The serrated shielding means 44 has an upper blade 46U secured to partition member 11 and a lower blade 46L secured to the plate or cover member 42. Each blade 46 (including blades 46U and 46L) is formed with a slot 48 (see FIGS. 6 and 7) therein wherethrough the structure of the spring plate 40 (including lower end portion 40L) passes. More particularly, the spring plate 40 passes through the guide aperture 13 of partition member 11 and/or guide chute 15, and through all slots 48 of the blades 46 of the shielding means 44 as limited between the upper end portion 40U secured to the spindle member 28 and the lower end portion 40L secured to the cover member 42. The blades 46 of the serrated shielding means 44 are preferably of an opaque material capable of blocking light rays. The blades 46 may also have a reflective material or coating to reflect the light rays from the sun. Optionally, they are of a translucent material capable of filtering or modifying a glaring light ray reflected thereagainst, such as from an ornamentation or the hood of a vehicle. A suitable material which the blades 46 may be fabricated from is a cellular, honeycombed material sold under the trademark DUETTE ® registered to Hunter Douglas Inc., wherein the spring plate 40 is not seen as it passes through each blade 46.

Figure 20:
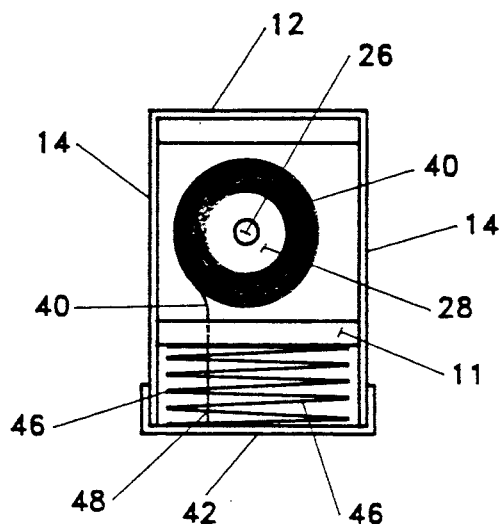
FIG. 20 is an enlarged end elevational view of the collapsible sun shade having the serrated shielding means totally enclosed within the housing with the cover plate disposed over the opening of the hollow housing.
Figure 18:
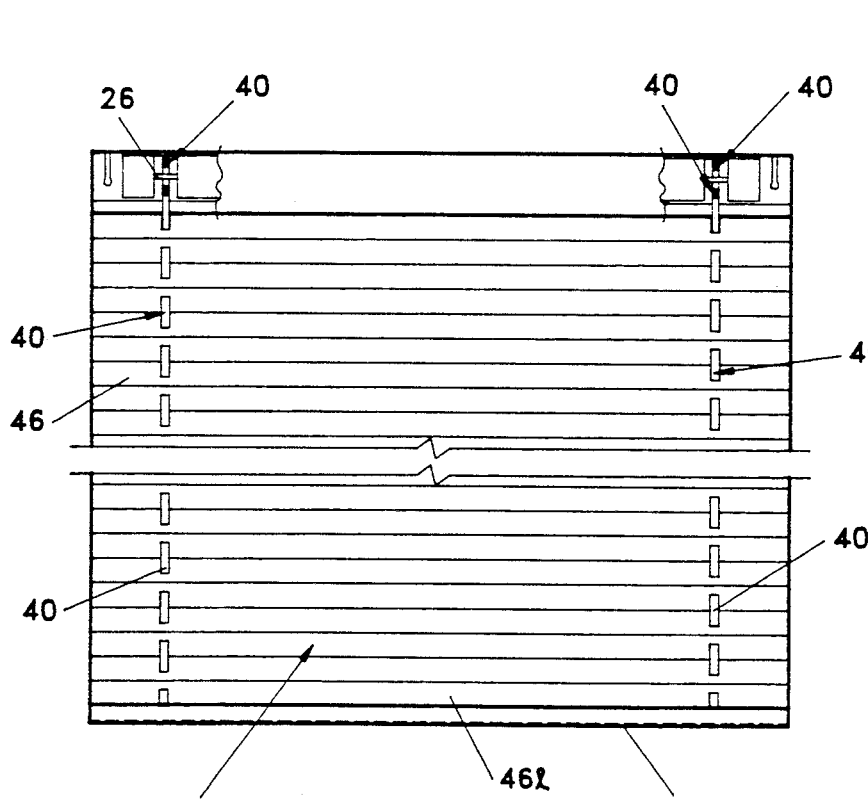
FIG. 18 is a segmented front elevational view of the shade assembly extended out of the housing wherein a pair of coiled spring plates are rotatably mounted such that the axis of the respective spool or spindle members is longitudinally disposed with respect to a rectangular shaped hollow housing that encloses the respective spool or spindle members.
Figure 19:
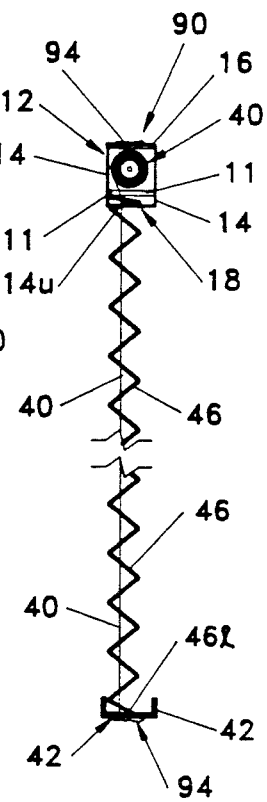
FIG. 19 is a segmented end elevational view of the collapsible sun shade of FIG. 18.

The serrated shielding means 44, more specifically each blade 46 of the shielding means 44, is capable of being folded through the front 18 and into the space between the partition member 11 and lower edges 14e—14e of the sides 14—14 and the cover member 42 biasingly flushed against the lower edges 14e—14e (see FIG. 20) by the retracted coil spring plate such that the serrated shielding means 44 becomes totally enclosed within the housing 12. Because the coiled spring plate 40 is normally resiliently wound on the spindle member 28, once the cover member 42 is pulled away from the spindle member 28 rotatably mounted to support members 22—22 in the hollow housing 12, the resilience force of the spring plate 40 tends to force this cover member 42 back towards the hollow housing 12. More specifically, the resilient force of the spring plate 40 biases or urges the cover member 42 towards the partition member 11 and the rotatable spindle member 28, such as to tend to cause the spring plate 40 to retract itself in a winding fashion around the spindle member 28 and to further tend to cause the pleated blades 46 to fold and collapse against the partition member 11 in the hollow housing 12 (see FIG. 20). To prevent or counteract such resilience force, a brake member, generally illustrated as 60, is provided to releasably engage the spindle member 28 to prevent the same from rotating.

In the preferred embodiment of the invention in FIG. 21, the shaft 26, as previously mentioned, is rotatably secured to each pair of support members 22 and bridges the space 24 therebetween; and the spindle member 28 is rotatably mounted to shaft 26. The brake member 60 for this embodiment is disposed between a support member 22 and the spindle member 28 and comprises a brake coil 62 which surrounds the shaft 26 and is in electrical communication with a power source (e.g. a car battery via the cigarette lighter socket or an electrical outlet in a house). Releasably contacting the brake coil 62 is a brake armature 66 which also surrounds the shaft 26 and is biased by spring 74. When electrical power is applied to the brake coil 62, the brake armature 66 is retracted from contact with spindle member 28 which frees up the spindle member 28 such that it can rotate. Thus, removing the electrical power to coil 62 allows the spring force from spring 74 of the brake member 60 to reposition the brake armature 66 against the spindle member 28 to lock the coiled spring plate 40 in any desired extended positions.

In the embodiment of the brake member 60 in FIG. 22, the brake member 60 comprises a hollow shank 70 slidably engaged to shaft 26. The hollow shank 70 is integrally bound to a flanged base 72 that is biased against the spindle member 28 by a compression spring 74. As best shown in FIG. 22, the spring 74 is in contact with a support member 22 and the flanged base 72 to continually bias the flanged base 72 against the spindle member 28 to prevent the latter from turning. A cord member 76 engages the hollow shank 70 and passes through an end 20 of the hollow housing 12 such that when the cord member 76 is pulled, the compression spring 74 is compressed further and the flanged base 72 is released off of the spindle member 28 such that it can rotate and release spring plate 40. After a predetermined amount of length of the spring plate 40 and the consecutively joined pleated blades 46 have been extended away from the housing 12, the cord member 76 is released such that the flanged base 72 is forced against the spindle member 28 to prevent same from rotating and to lock the predetermined length of the plural blades 46 out of the housing 12.

Figure 11:
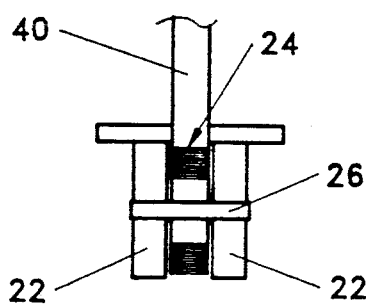
FIG. 11 is an end elevational view of another embodiment of the coiled spring assembly having a pair of coil spring plates wound around a pair of spools or spindle members that are rotatably mounted to a pair of support members such that the coil spring plates mount contiguously with respect to each other in order that the structures of the respective coil spring plates can both pass through a guide slot in a laminar or superimposed contacting form.
Figure 12:
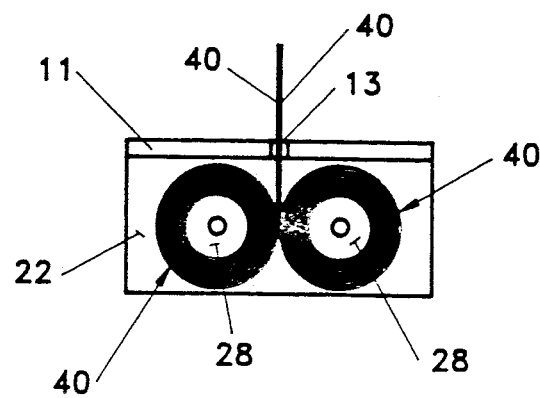
FIG. 12 is a side elevational view of the embodiment of the coiled spring assembly of FIG. 11.
Figure 13:
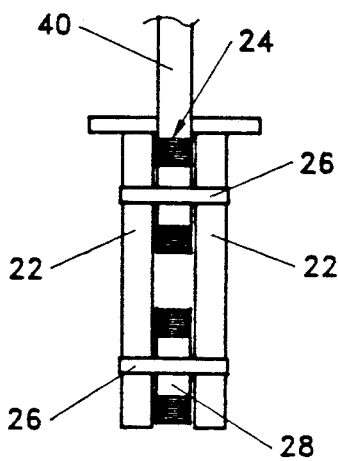
FIG. 13 is another embodiment of the coiled spring assembly having a pair of coil spring plates wound around a pair of spools or spindle members which are rotatably mounted to a pair of support members such that the coil spring plates are vertically aligned in order that the structures of the respective coil spring plates can both pass through a guide slot in a laminar or superimposed form.
Figure 14:
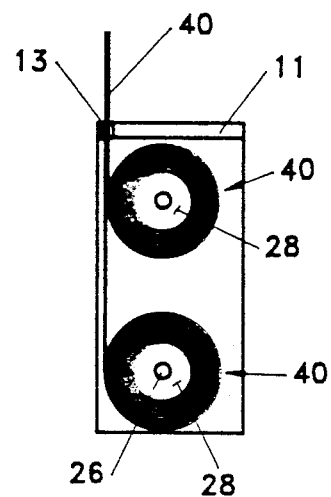
FIG. 14 a side elevational view of the embodiment of the coiled spring assembly of FIG. 13.
Figure 15:
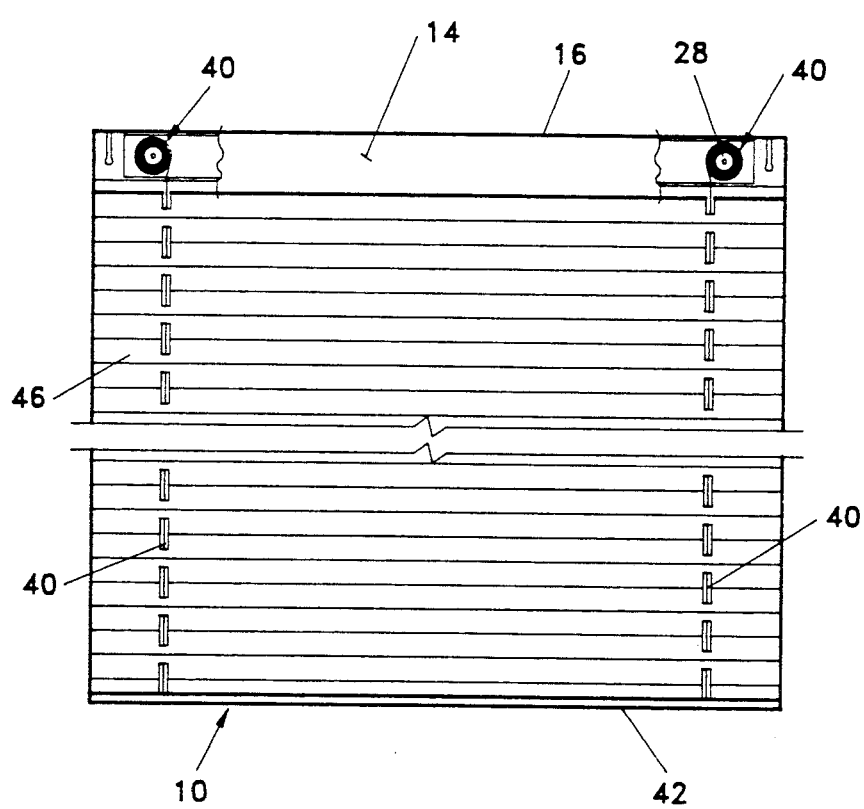
FIG. 15 is a segmented front elevational view of the shade assembly extended out of the housing wherein a pair of coiled spring plates are rotatably mounted such that the axis of the respective spool or spindle members is transverse or laterally disposed with respect to a rectangular shaped hollow housing that encloses the respective spool or spindle members.

As best illustrated in FIGS. 11-14, the coiled spring plate embodiment of the present invention comprises a pair of coiled spring plates 40—40 such that the structural portion of the coiled spring plates that passes through the slots 48 of the respective blades 46 is laminated with two plates 40—40 imposed against each other. In this embodiment, laminated plates 40—40 pass through a guide aperture 13 and/or guide chute 15 and have their respective lower end portions 40L—40L connecting to the cover member 42. The two coiled spring plates 40—40 may be aligned such that the axis of the spindle member 28—28 (and the shafts 26—26), which rotatably supports the coiled spring plates 40—40, is either aligned in and/or with a horizontal plane as depicted in FIGS. 11 and 12, or aligned in and/or with a vertical plane as best shown in FIGS. 13 and 14.

Figure 23:
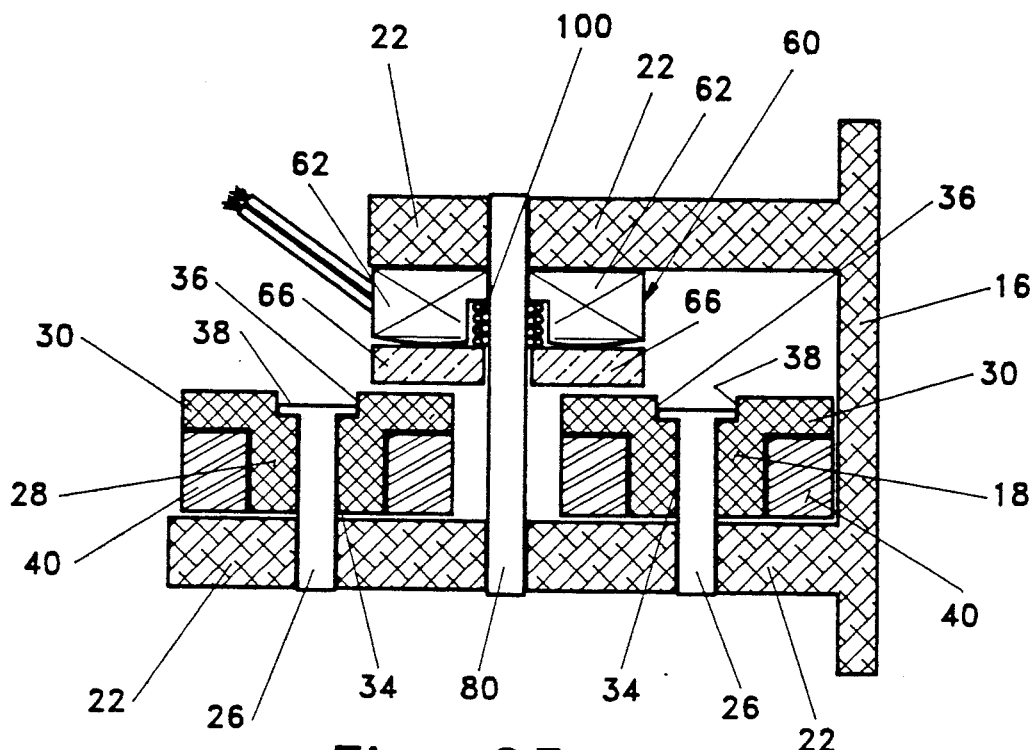
FIG. 23 is a vertical sectional view of an electromechanical brake member disposed on a support member such as to be in a position to releasably engage a pair of spool or spindle members to prevent same from rotating and assisting in the release of a pair of coiled spring plates wound thereto.

Both embodiments of the brake member 60 may be arranged to brake a pair of spindle members 28—28 which rotatably support a pair of coiled spring plates 40—40. In FIG. 23 a shaft 80 extends and bridges the pair of support members 22—22 between a pair of spindle members 28—28 which support a pair of coiled spring plates 40—40 and are rotatably supported on shafts 26—26 that only rotatably engage to one support member 22. The shafts 26—26 for this embodiment are formed with bearing plates 38—38 which seat in recesses 36—36 of the flanged faces 30—30. The brake member 60 for this embodiment has the brake coil 62 which surrounds the shaft 80 and is in electrical communication with a power source. The brake armature 66 is in releasable engagement with the brake coil 62. As shown in FIG. 23, the brake armature 66 also surrounds the shaft 80 and is biased by spring 74. When the brake coil 62 becomes electrically activated, the brake armature 66 is retracted from contact with both spindle members 28—28 such that they both may rotate. After a predetermined length of the spring plates 40—40 and the plural pleated blades 46 have been extended away from the housing 12, electrical power is removed from the coil 62 to allow the spring force from spring 74 of the brake member 60 to reposition the brake armature 66 against both spindle members 28—28 to lock the pair of coiled spring plates 40—40 from rotating the spindle members 28—28.

Figure 24:
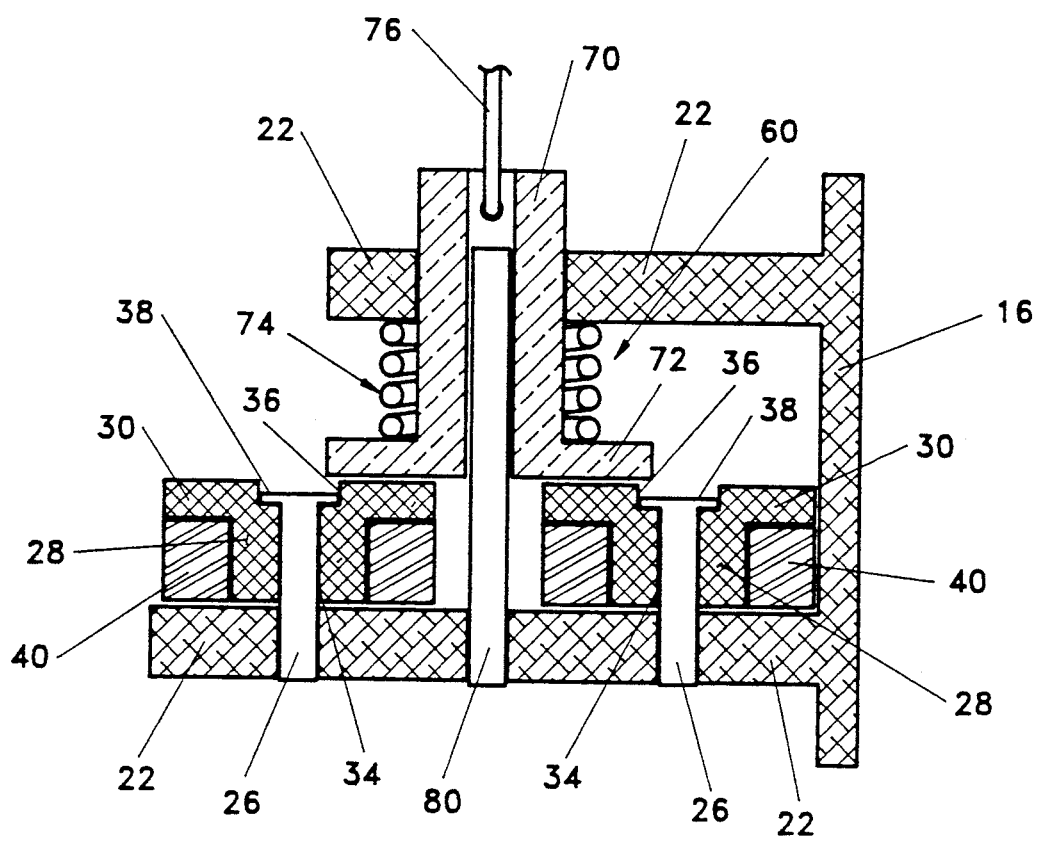
FIG. 24 is a vertical sectional view of a mechanical brake member disposed on a support member such as to be in a position to releasably engage a pair of spool or spindle members to prevent same from rotating and assisting in the release of a pair of coiled spring plates wound thereto.

For the embodiment of the brake 60 in FIG. 24, the hollow shank 70 is slidably engaged to shaft 80 which bridges the pair of support members 22—22 between a pair of spindle members 28—28 which are rotatably supported by shafts 26—26. The shafts 26—26 for this embodiment are identical to shafts 26—26 in FIG. 23 since they too are formed with bearing plates 38—38 that seat in recesses 36—36 of the flanged faces 30—30 of the spindle members 28—28. When the cord member 76 is pulled, the compression spring 74 is compressed further and the flanged base 72 is released from engagement with both spindle members 28—28 such that they are free to rotate and release both spring plates 40—40 in a laminated form. After a predetermined length of laminated spring plates 40—40 has been extended away from the housing 12, the cord member 76 is released such that the flanged base 72 is formed against both flanged faces 30—30 of the spindle members 28—28 to prevent them from rotating and to lock the predetermined length of laminated spring plates 40—40 (along with a predetermined length of plural blades 46) out of the housing 12.

Figure 10:
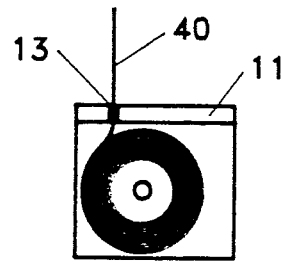
FIG. 10 is a side elevational view of the embodiment of the coiled spring plate of FIG. 9.
Figures 25, 26:
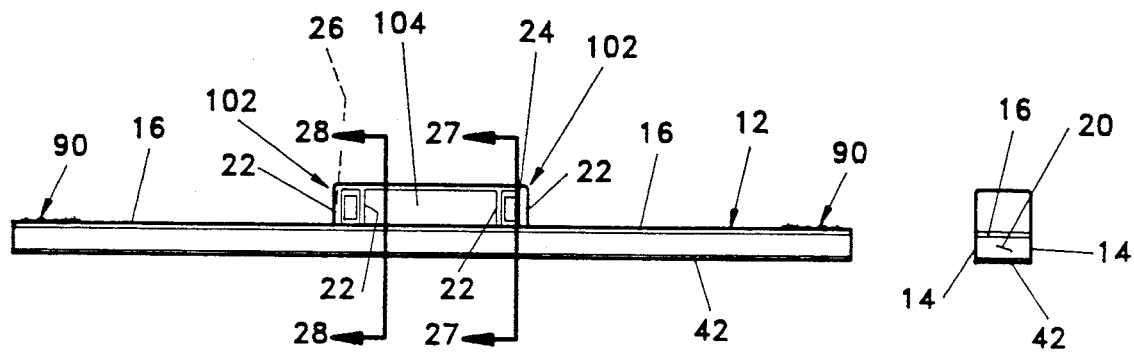
FIG. 25 is a side elevational view of another embodiment of the invention wherein a pair of coiled spring plates are mounted in a handle.
FIG. 26 is an end elevational view of the embodiment of the invention in FIG. 25.
Figures 27, 28:
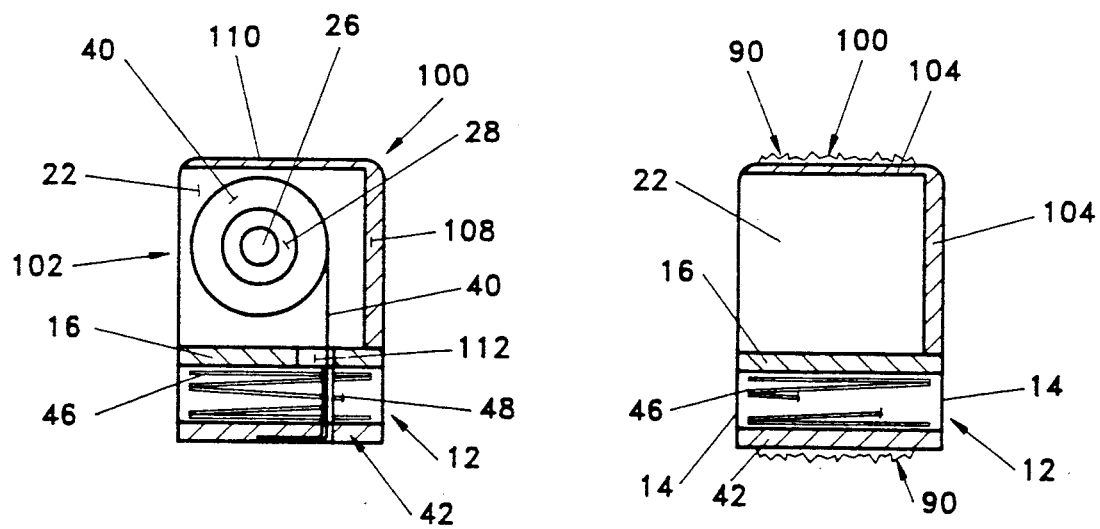
FIG. 27 is a vertical sectional view taken in direction of the arrows and along the plane of line 27—27 in FIG. 25.
FIG. 28 is a vertical sectional view taken in direction of the arrows and along the plane of line 28—28 in FIG. 25.

In the embodiment of the invention in FIGS. 25-30, a handle, generally illustrated as 100, is secured to the back 16 of the housing 12. The handle 100 comprises a pair of hollow ends, each generally illustrated as 102, with an L-shaped bridging member 104 interconnecting the two hollow ends 102—102. The hollow ends 102 are each preferably formed with a pair of support members 22—22 and a rear wall 108 secured to the pair of support members 22—22 and a roof 110 secured to the support members 22—22 and to the rear wall 108 (see FIG. 27). The space 24 is between the support members 22—22. Between the pair of support members 22—22 of the handle 100 and bridging the space 24 is the shaft 26. Rotatably mounted on the shaft 26 is the spool 28. Between the support members 22—22 of each hollow end 102 is the embodiment of the invention in FIG. 22 (i.e., brake member 60-spring plate 40 combination), or the embodiment in FIGS. 9-10 having a sole spring plate 40, or the embodiment of FIGS. 11-14 which may also be braked as indicated in FIGS. 23 and 24. By way of example only, FIGS. 25-30 depict a single spring plate 40 (i.e., the embodiment in FIGS. 9-10) with the back 16 having an aperture 112 wherethrough the spring plate 40 passes (see FIG. 27). As best shown in FIGS. 25 and 28, the bridging member 104, the cover plate 42, and the back 16 of the hollow housing 12, each may include a fastening means, identified as "90" below.

Figure 29:
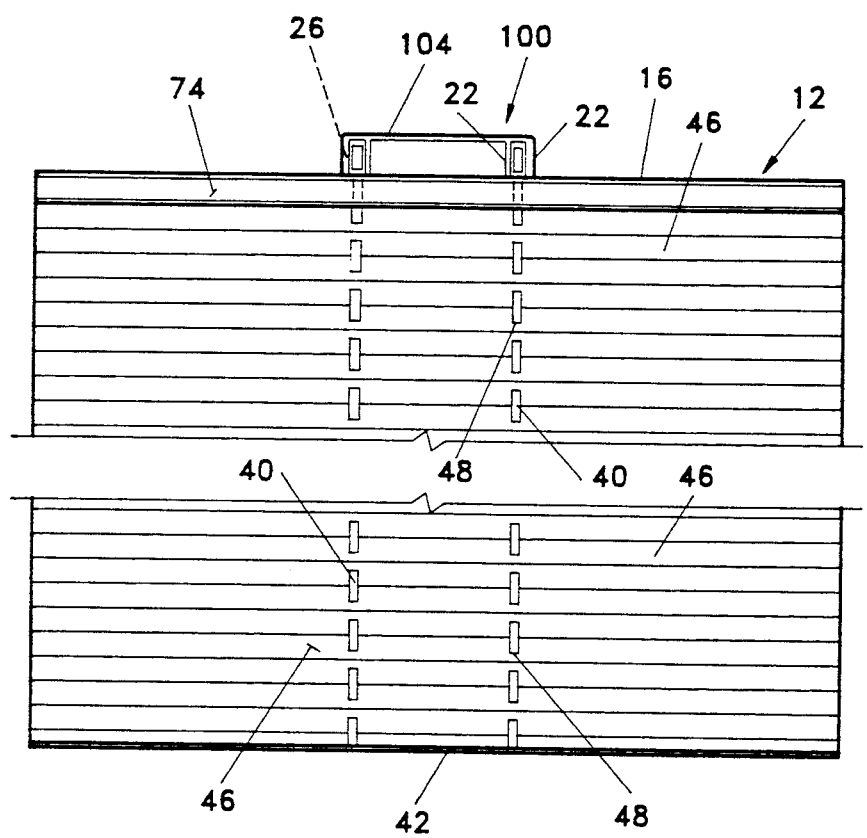
FIG. 29 is a side elevational view of the embodiment of the invention in expanded position.
Figure 30:
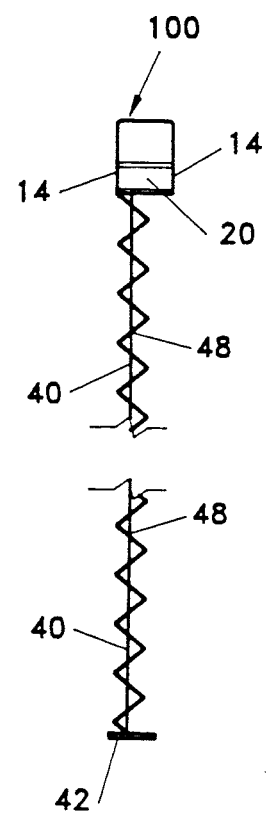
FIG. 30 is an end elevational view of the embodiment of the invention in FIG. 29.

The housing 12 of the present invention may be secured to any window or windshield or to any support post such as by the employment of any suitable fastening means, generally illustrated as 90, on the housing 12 such as a hook 92 for engaging an eyelet (not shown) on the support post, or a hook-loop fastening assembly 94 sold under the trademark VELCRO ®. Similarly, after the cover member 42 has been pulled away from the housing 12 to extend a desired length of pleated blades 46 out of the housing for sun shielding purposes, the cover member 42 may be connected to any window or windshield or to any support post such as by the use of the hook 92 or the hook-loop fastening assembly 94, both of which connect to the cover member 42. The suitable fastening means 90 for both the housing 12 and cover member 42 include high-energy permanent magnets, two-sided tape, adhesive, high-temperature/high-strength super lock fasteners, snap fasteners etc. In the embodiment of the invention in FIGS. 25-30, the cover plate 42 is connected to a door post, a windshield, a rear deck of an automobile, etc. through the use of or by the fastening means 90. The handle 100 is subsequently grasped and pulled, causing the housing 12 to also move simultaneously which in turn further causes the coiled spring plates 40—40 to uncoil and blades to become extended out from the housing 12 as shown in FIG. 29. The fastening means 90 on the bridging member 110 (of the handle 100) or the fastening means 90 on the back 16 (of the housing 12) may be secured to the door post, etc., on the opposite side of the windshield or window.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:
1. A collapsible sun shade comprising:
a generally hollow housing; at least one support means contained in and bound to said hollow housing for rotatably supporting a coiled spring plate; a plate member; a serrated shielding means for shielding the sun and including a plurality of pleated blades consecutively adjoined together to provide a serrated shape with a lower extreme blade defining a lower blade and an upper extreme blade defining an upper blade and with each of said plural blades having a structure defining an aperture, said upper blade contained in and coupled to said hollow housing and said lower blade secured to said plate member; at least one coiled spring plate having an upper end section and a lower end section and normally resiliently wound on a spindle member rotatably mounted to said support means and in said hollow housing, said upper end section of said coiled spring plate securing to said spindle member and said lower end section of said coiled spring plate comprising to said plate member and said coiled spring plate passing through all of said apertures of said blades; said hollow housing having a pair of opposed sides with a pair of lower side edges, a back bound to the opposed sides, and a generally open front wherethrough said serrated shielding means retractably passes, a partition member secured to the opposed sides and having a structure defining a guide aperture for guiding and receiving therethrough a structure of the coiled spring plate, a pair of ends connected to ends of the sides and the back such that the hollow housing essentially forms a rectangular box with the partition member forming a floor whereto the upper blade is coupled and the open front providing a longitudinal opening that is defined by the distance between the lower side edges and between the pair of ends; said at least one support means comprises a first pair of support members disposed between the partition and the back and secured to the back of the hollow housing; said at least one coiled spring plate comprising a first spindle member rotatably secured to said first pair of support members and a first coiled spring plate secured to the first spindle member; said at least one support means additionally comprises a second pair of support members disposed between the partition and the back and secured to the back of the hollow housing; and said at least one coiled spring plate additionally comprising a second spindle member rotatably secured to said second pair of support members and a second coiled spring plate secured to said second spindle members.

2. The collapsible sun shade of claim 1 additionally comprising a first brake member supported by said partition member and releasably engaged to said first spindle member for preventing the first spindle member from rotating, whereby upon releasing the first brake member from engagement with the first spindle member and upon lifting the plate member, said shielding means is extended from within the hollow housing and upon engaging again the first brake member with the first spindle member the shielding means is disposed and retained for sun shielding purposes.

3. The collapsible sun shade of claim 2 additionally comprising a second brake member supported by said partition member and releasably engaged to said second spindle member for preventing the second spindle member from rotating, whereby upon releasing the second brake member from engagement with the second spindle member and upon lifting the plate member, said shielding means is extended from within the hollow housing and upon engaging again the second brake member with the second spindle member the shielding means is disposed and retained for sun shielding purposes.

4. The collapsible sun shade of claim 3 wherein said first and said second coiled spring plate both pass through said guide aperture and in contact with each other when passing through said guide aperture.

5. A collapsible sun shade comprising:
a generally hollow housing; a handle member secured to the housing; at least one support means contained in and bound to said handle for rotatably supporting a coiled spring plate; a plate member; a serrated shielding means for shielding the sun and including a plurality of pleated blades consecutively adjoined together to provide a serrated shape with a lower extreme blade defining a lower blade and an upper extreme blade defining an upper blade and with each of said plural blades having a structure defining an aperture, said upper blade contained in and coupled to said hollow housing and said lower blade secured to said plate member; at least one coiled spring plate having an upper end section and a lower end section and normally resiliently wound on a spindle member rotatably mounted to said support means and in said handle, said upper end section of said coiled spring plate securing to said spindle member and said lower end section of said coiled spring plate securing to said plate member and said coiled spring plate passing through all of said apertures of said blades; said hollow housing having a pair of opposed sides with a pair of lower side edges, a back bound to the opposed sides, and a generally open front wherethrough said serrated shielding means retractably passes, a partition member secured to the opposed sides and having a structure defining a guide aperture for guiding and receiving therethrough a structure of the coiled spring plate, a pair of ends connected to ends of the sides and the back such that the hollow housing essentially forms a rectangular box with the partition member forming a floor whereto the upper blade is coupled and the open front providing a longitudinal opening that is defined by the distance between the lower side edges and between the pair of ends; said at least one support means comprises a first pair of support members disposed between the partition and the back and secured to the back of the hollow housing; said at least one coiled spring plate comprising a first spindle member rotatably secured to said first pair of support members and a first coiled spring plate secured to the first spindle member; said at least one support means additionally comprises a second pair of support members disposed between the partition and the back and secured to the back of the hollow housing; and said at least one coiled spring plate additionally comprising a second spindle member rotatably secured to said second pair of support members and a second coiled spring plate secured to said second spindle members.

6. The collapsible sun shade of claim 5 wherein said coiled spring plate is of a constant force to provide a complete shade support and retraction power.

7. The collapsible sun shade of claim 5 additionally comprising a first brake member supported by said partition member and releasably engaged to said first spindle member for preventing the first spindle member from rotating, whereby upon releasing the first brake member from engagement with the first spindle member and upon lifting the plate member, said shielding means is extended from within the hollow housing and upon engaging again the first brake member with the first spindle member the shielding means is disposed and retained for sun shielding purposes.

8. The collapsible sun shade of claim 7 additionally comprising a second brake member supported by said partition member and releasably engaged to said second spindle member for preventing the second spindle member from rotating, whereby upon releasing the second brake member from engagement with the second spindle member and upon lifting the plate member, said shielding means is extended from within the hollow housing and upon engaging again the second brake member with the second spindle member the shielding means is disposed and retained for sun shielding purposes.

9. The collapsible sun shade of claim 8 wherein said first and said second coiled spring plate both pass through said guide aperture and in contact with each other when passing through said guide aperture.

10. A collapsible sun shade comprising:
a generally hollow housing; at least one support means contained in and bound to said hollow housing for rotatably supporting a coiled spring plate; a plate member; a serrated shielding means for shielding the sun and including a plurality of pleated blades consecutively adjoined together to provide a serrated shape with a lower extreme blade defining a lower blade and an upper extreme blade defining an upper blade and with each of said plural blades having a structure defining an aperture, said upper blade contained in and coupled to said hollow housing and said lower blade secured to said plate member; at least one coiled spring plate having an upper end section and a lower end section and normally resiliently wound on a spindle member rotatably mounted to said support means and in said hollow housing, said upper end section of said coiled spring plate securing to said spindle member and said lower end section to said coiled spring plate securing to said plate member and said coiled spring plate passing through all of said apertures of said blades; said hollow housing having a pair of opposed sides with a pair of lower side edges, a back bound to the opposed sides, and a generally open front wherethrough said serrated shielding means retractably passes, a partition member secured to the opposed sides and having a structure defining a guide aperture for guiding and receiving therethrough a structure of the coiled spring plate, a pair of ends connected to ends of the sides and the back such that the hollow housing essentially forms a rectangular box with the partition member forming a floor whereto the upper blade is coupled and the open front providing a longitudinal opening that is defined by the distance between the lower side edges and between the pair of ends; and said at least one support means being disposed within said hollow housing between the partition member and the back.

11. The collapsible sun shade of claim 10 wherein said at least one support means comprises a pair of support members secured to said back; and a brake shaft extending and bridging the pair of support members; a first shaft and a second shaft engaged to one of said support members such that said brake shaft is between the first and second shaft; a first spindle member rotatably engaged to said first shaft and a second spindle member rotatably engaged to said second shaft; and said at least one coiled spring plate comprises a first coiled spring plate engaged to said first spindle member and a second coiled spring plate engaged to said second spindle member; a brake member secured around said brake shaft and releasably engaged to both said first spindle member and said second spindle member for preventing the first and second spindle members from rotating, whereby upon releasing the brake member from engagement with the first and second spindle members and upon lifting the plate member, said shielding means is extended from within the hollow housing and upon engaging again the brake member with the first and second spindle member the shielding means is disposed and retained for sun shielding purposes.

* * * * *